United States Patent
Kwan et al.

(10) Patent No.: US 9,065,755 B2
(45) Date of Patent: Jun. 23, 2015

(54) LOW-LATENCY SWITCHING

(71) Applicant: Broadcom Corporation, Irvine, CA (US)

(72) Inventors: Bruce Kwan, Sunnyvale, CA (US); Puneet Agarwal, Cupertino, CA (US)

(73) Assignee: BROADCOM CORPORATION, Irvine, CA (US)

( * ) Notice: Subject to any disclaimer, the term of this patent is extended or adjusted under 35 U.S.C. 154(b) by 82 days.

(21) Appl. No.: 13/724,361

(22) Filed: Dec. 21, 2012

(65) Prior Publication Data

US 2014/0043974 A1 Feb. 13, 2014

Related U.S. Application Data

(60) Provisional application No. 61/680,460, filed on Aug. 7, 2012.

(51) Int. Cl.
*H04L 12/815* (2013.01)
*H04L 12/933* (2013.01)

(52) U.S. Cl.
CPC .............. *H04L 47/22* (2013.01); *H04L 49/10* (2013.01)

(58) Field of Classification Search
USPC .......... 370/230, 235, 392, 412, 428, 468, 474
See application file for complete search history.

(56) References Cited

U.S. PATENT DOCUMENTS

| | | | | |
|---|---|---|---|---|
| 5,491,687 | A | * | 2/1996 | Christensen et al. .......... 370/253 |
| 6,715,007 | B1 | * | 3/2004 | Williams et al. ................ 710/52 |
| 7,391,789 | B2 | * | 6/2008 | Kang et al. ..................... 370/445 |
| 2002/0083189 | A1 | * | 6/2002 | Connor ......................... 709/236 |
| 2005/0201373 | A1 | * | 9/2005 | Shimazu et al. ............... 370/389 |
| 2006/0114907 | A1 | * | 6/2006 | Wu ................................ 370/392 |
| 2006/0209687 | A1 | * | 9/2006 | Yagawa et al. ................. 370/229 |
| 2008/0273546 | A1 | * | 11/2008 | Johnson et al. ................ 370/419 |

* cited by examiner

*Primary Examiner* — Michael Thier
*Assistant Examiner* — Prince A Mensah
(74) *Attorney, Agent, or Firm* — Oblon, McClelland, Maier & Neustadt, L.L.P.

(57) ABSTRACT

Disclosed are systems and methods for cut-through switching in port-speed-mismatched networks. Specifically, systems and methods are described in which data packets from an ingress device are paced, thereby matching the data rate of the ingress device with the data rate of the egress device.

17 Claims, 3 Drawing Sheets

LOW-LATENCY SWITCHING

CROSS-REFERENCE TO RELATED APPLICATION

This application claims the benefit of U.S. provisional application entitled, "Low-Latency Switching," having Ser. No. 61/680,460, filed Aug. 7, 2012, which is entirely incorporated herein by reference.

BACKGROUND

Distributed networks with client-server architectures are now ubiquitous. These networks are used for various high-performance computing needs, such as, for example, finite element analyses, simulations, gaming, and other computationally-intensive applications. For these types of computationally-intensive applications, latency in packet switching can result in undesired delays. As a result, the industry continues to seek ways of reducing latency.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
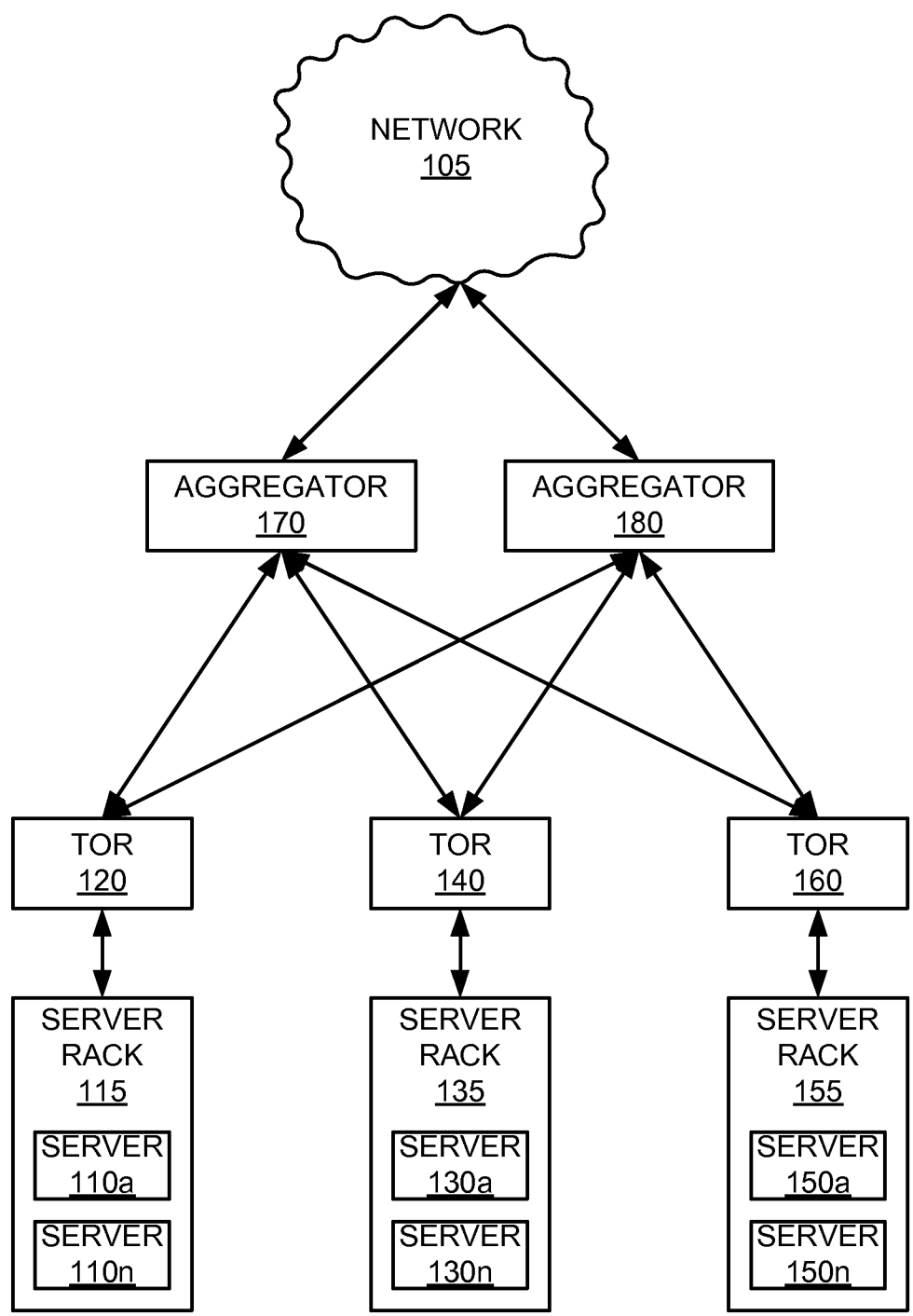
FIG. 1 is a diagram showing one embodiment of a packet-switching architecture.

In packet-switching networks data packets can travel through a tortuous path of network components, with each component adding to latency. For computationally-intensive applications, this latency can result in undesired consequences.

Typically, there are two packet-switching paradigms in packet-switching networks. Namely, store-and-forward switching and cut-through switching. For store-and-forward, the switch receives an entire frame and checks the integrity of the frame before making a decision to either forward a data packet or drop the data packet. Unlike store-and-forward switches, cut-through switches typically begin forwarding data packets as soon as a first portion of a data packet arrives in to the switch. Note, the first 100 bytes or so of a data packet are sufficient to resolve the proper egress port to use in forwarding the packet. Thus, the forwarding of data packets occurs much sooner for cut-through than it does for store-and-forward. As one can imagine, cut-through switches have the advantage of being faster than store-and-forward switches.

Since cut-through switches examine less information prior to forwarding data packets, the size of an incoming data packet is largely irrelevant to the cut-through switch, as long as the ingress data rate (i.e., the rate at which the data enters the cut-through buffer) matches the egress data rate (i.e., the rate at which the data exits the cut-through buffer). However, in port-speed-mismatched environments, where ingress data rates are faster than egress data rates, it is entirely possible for the size of a data packet to be larger than the size of a cut-through buffer. Thus, if the ingress rate is faster than the egress rate, the cut-through buffer would quickly overflow. For this reason, in port-speed-mismatched environments, store-and-forward switching is typically used to forward data packets. As one can imagine, providing the ability to employ cut-through switching in port-speed-mismatched environments would allow for lower latency.

Several embodiments allow for cut-through switching in port-speed-mismatched networks. Specifically, systems and methods are described in which data packets from an ingress device are paced, thereby matching the data rate of the ingress device with the data rate of the egress device. As a result, the problem of cut-through-buffer overflow is obviated with the pacing of the data packets.

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

FIG. 1 is a diagram showing one embodiment of a packet-switching architecture. As shown in FIG. 1, the packet-switching architecture includes a plethora of components that are operatively coupled to a network 105 (e.g., the Internet). In some embodiments, the architecture includes multiple server racks 115, 135, 155, each having a bank of servers 110a . . . 110n (collectively 110), 130a . . . 130n (collectively 130), 150a . . . 150n (collectively 150). Each server rack 115, 135, 155 is operatively coupled to its respective top-of-the-rack (TOR) switch 120, 140, 160, which allows the servers 110, 130, 150 to transmit and receive data packets through their respective TOR switches 120, 140, 160. The TOR switches 120, 140, 160 are, in turn, operatively coupled to aggregators 170, 180, which allow the TOR switches 120, 140, 160 to access the network 105 through the aggregators 170, 180.

Insofar as each TOR switch 120, 140, 160 has access to both of the aggregators 170, 180, data packets from one server 110a can reach another server 150n through many different circuitous paths. For example, data packets can travel from an originating server 110a, through its TOR switch 120, then through one of the aggregators 170, to another TOR switch 160, eventually arriving at an endpoint server 150n. Alternatively, the data packet can travel from the originating server 110a, through its TOR switch 120, then through another aggregator 180, to the other TOR switch 160, to arrive at the endpoint server 150n.

As one can imagine, given the sheer number of components that can exist in the pathway for a data packet, it is entirely possible for these components to have different transmission rates. Thus, for different ingress devices and egress devices, data packets can experience both store-and-forward switching and cut-through switching as the packets travel through the distributed architecture.

Figure 2:
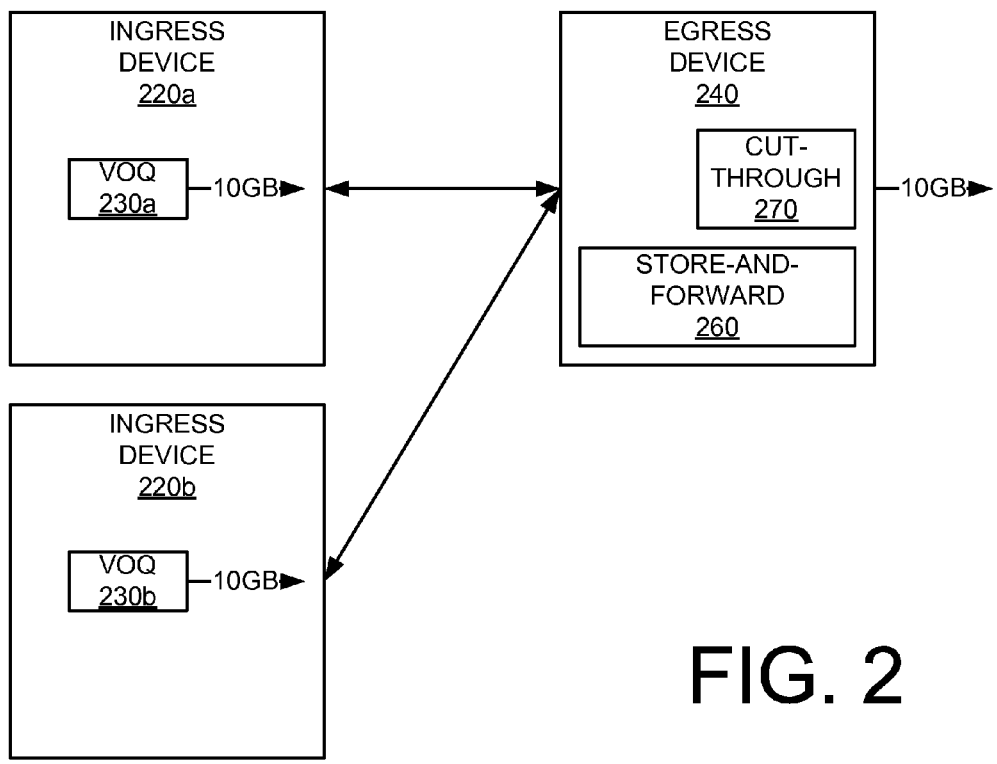
FIG. 2 is a diagram showing one embodiment of the system in which cut-through switching occurs.

FIG. 2 is a diagram showing one embodiment of the system in which cut-through switching occurs. The embodiment of FIG. 2 shows a system comprising an egress device 240, and several ingress devices 220a, 220b (collectively 220). Each ingress device 220a, 220b comprises a virtual output queue (VOQ) 230a, 230b (collectively 230). The VOQ 230 handles data output for the ingress device 220. The egress device 240 comprises a cut-through buffer 270 for cut-through switching, and also a store-and-forward buffer 260 for store-and-forward switching. For purposes of illustration, the ingress devices 220 in this embodiment have an ingress transmission rate of 10 GB per second, and the egress device 240 has an egress transmission rate of 10 GB per second.

Typically, for cut-through switching to occur, the egress device 240 broadcasts a cut-through-eligible signal to all ingress devices 220. In response to the broadcast signal, one of the ingress elements 220a captures the cut-through eligibility of the egress device 240. Insofar as the embodiment of FIG. 2 shows port-speed-matched devices 220, 230, data packets from the ingress device 220a are switched at the egress device 240 through the cut-through buffer 270. The challenge, however, occurs in the event that the port speeds become mismatched, with the ingress data transmission rate being faster than the egress data transmission rate.

Figure 3:
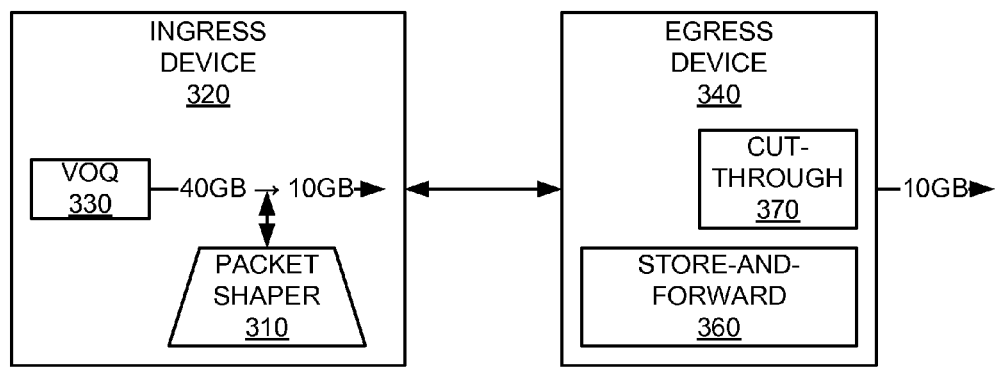
FIG. 3 is a diagram showing one embodiment of a system that permits cut-through switching with devices operating at different transmission rates.

One embodiment of this port-speed-mismatched scenario is shown with reference to FIG. 3. As shown in FIG. 3, one embodiment of a system permits cut-through switching with devices operating at different transmission rates. The system of FIG. 3 comprises an ingress device 320 operatively coupled to an egress device 340. For purposes of illustration, the ingress device 320 has an ingress transmission rate of 40 GB per second, while the egress device 340 has an egress transmission rate of 10 GB per second. In other words, the ingress transmission rate is faster than the egress transmission rate.

The embodiment of FIG. 3 shows the ingress device 320 comprising a VOQ 330 with a finite buffer size, and a packet shaper 310 that is directly connected to the output of the ingress device 320 via the VOQ 330. The VOQ 330 handles the data output for the ingress device 320, while the packet shaper 310 paces the data packets to change the effective transmission rate of the data packets. By way of illustration, FIG. 3 shows the effective transmission rate of the ingress device 320 being reduced from 40 GB per second to 10 GB per second, thereby matching the ingress transmission rate to the egress transmission rate. The egress device 340 comprises a cut-through buffer 370 for cut-through switching of data packets, and a store-and-forward buffer 360 buffer for store-and-forward switching of data packets.

In operation, the egress device 340 broadcasts a cut-through-eligible signal. In response to the broadcast signal, the ingress device 320 captures the cut-through eligibility for cut-through switching of data packets. Given that there is a port-speed mismatch between the ingress device 320 and the egress device 340, the ingress device 320 must, preferably, match the data transmission rate of the egress device 320. One method of accomplishing this is shown with reference to FIG. 4.

Figure 4:
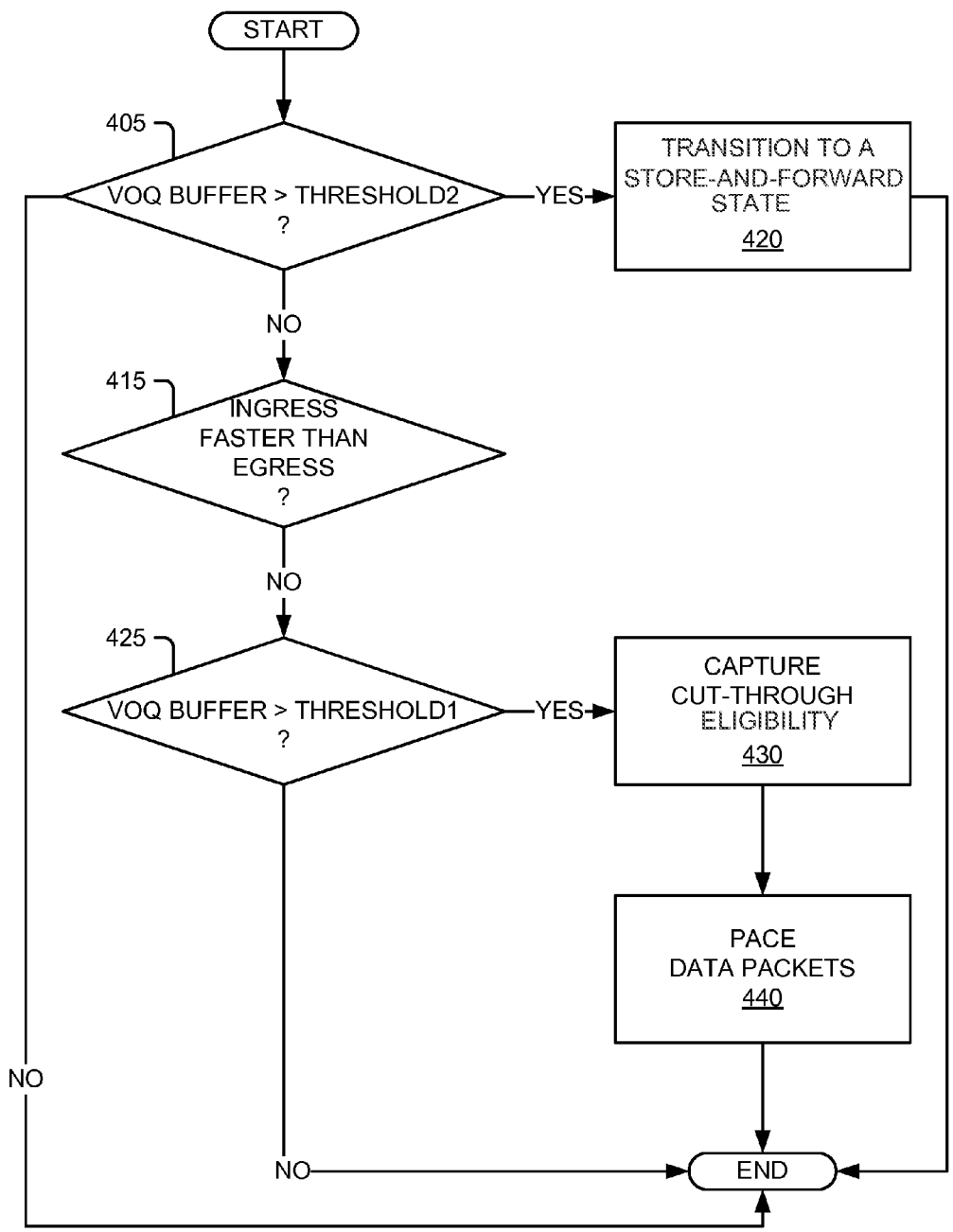
FIG. 4 is a flowchart showing one embodiment of a method for pacing data packets.

FIG. 4 is a flowchart showing one embodiment of a method for pacing data packets with respect to a state of an ingress port or device. As shown in FIG. 4, the ingress device 320 determines 405 whether or not the size of the VOQ 330 buffer is greater than a predefined threshold. This predefined threshold is a number that represents a data capacity that, if exceeded, would largely nullify the advantages of cut-through switching over store-and-forward switching.

If the ingress device 320 determines that the VOQ 330 buffer size is greater than the predefined threshold, then the ingress device 320 transitions 420 from being in a cut-through state to a store-and-forward state.

Conversely, if the ingress device 320 determines that the VOQ 330 buffer size does not exceed the predefined threshold value, then the ingress device 320 determines 415 if the ingress transmission rate is faster than the egress transmission rate. If the ingress transmission rate is not faster than the egress transmission rate, then the remaining steps of FIG. 4 are bypassed, since there is no need to reduce the ingress transmission rate. Alternatively, if the ingress transmission rate is faster than the egress transmission rate, then the ingress device 320 determines 425 whether or not the size of the VOQ 330 buffer is greater than another predefined threshold value. This other threshold value again represents a number that would largely nullify the advantages of cut-through switching.

If the size of the VOQ 330 buffer exceeds this other threshold (and the ingress transmission rate is faster than the egress transmission rate), then ingress device 320 captures 430 the cut-through eligibility for cut-through packet switching. Thereafter, the packet shaper 310 paces the data packets, thereby effectively matching the ingress transmission rate with the egress transmission rate. In other words, the packet shaper 310 is responsive to the needs of the ingress device 320 to match the transmission rate of the egress device 340.

This approach now permits cut-through switching for port-speed-mismatched devices, such as the ingress device 320 (40 GB per second) and the egress device 340 (10 GB per second). And, as one can appreciate, by allowing cut-through switching in port-speed-mismatched systems, packet latency can be reduced.

The packet shaper may be implemented in hardware, software, firmware, or a combination thereof. In the preferred embodiment(s), the packet shaper is implemented in hardware using any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In an alternative embodiment, the packet shaper is implemented in software or firmware that is stored in a memory and that is executed by a suitable instruction execution system.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Although exemplary embodiments have been shown and described, it will be clear to those of ordinary skill in the art that a number of changes, modifications, or alterations to the disclosure as described may be made. For example, while the packet shaper is shown as being an integrated component of the ingress device, one having skill in the art will appreciate that the packet shaper can be located at the output of the ingress device. Alternatively, the packet shaper can be located at the output of the VOQ. For other embodiments, the packet shaper can be interposed between the ingress device and the egress device, or, alternatively, can be operatively coupled to the ingress device and the egress device in any manner that allows the packet shaper to effectively alter the data transmission rate, thereby matching the ingress data transmission rate to the egress data transmission rate. Also, while example data rates of 10 GB and 40 GB have been used for illustrative purposes, it should be apparent that the packet shaper can convert other data rates. Additionally, while specific components are identified for performing the recited method steps of FIG. 4, it should be appreciated that other components can be used to perform these steps. These and other such changes, modifications, and alterations should therefore be seen as within the scope of the disclosure.

What is claimed is:

1. A system, comprising:
an egress device having an egress transmission rate, the egress device comprising:
a cut-through buffer for cut-through switching of the data packets; and
a store-and-forward buffer for store-and-forward switching of the data packets;
an ingress device having an ingress transmission rate, the ingress device comprising a virtual output queue, the virtual output queue having a buffer size, the ingress device configured to:
determine whether the ingress transmission rate is faster than the egress transmission rate;
determine whether the buffer size exceeds a first threshold value; and
in response to determining that the ingress transmission rate is faster than the egress transmission rate, and further in response to determining that the buffer size exceeds the first threshold value:
capture cut-through eligibility to an egress port for cut-through switching; and
pace the data packets to match the egress transmission rate.

2. The system of claim 1, the ingress device further configured to:
determine whether the buffer size exceeds a second threshold value, the second threshold value being greater than the first threshold value; and
in response to determining that the buffer size exceeds the second threshold value, transition to a store-and-forward mode for store-and-forward switching from a cut-through mode.

3. The system of claim 1, further comprising:
a packet shaper located on an output of the ingress device, the packet shaper configured to pace the data packets.

4. A system comprising:
an egress device for cut-through transmission of packets, the egress device configured to transmit the packets at an egress transmission rate;
an ingress device including a virtual output queue having a buffer size, the ingress device configured to:
determine whether an ingress transmission rate of the ingress device is faster than the egress transmission rate;
determine whether the buffer size exceeds a first threshold value; and
capture cut-through eligibility for cut-through switching and control a packet shaper to pace the packets from the ingress device to match the egress transmission rate when the ingress transmission rate is faster than the egress transmission rate and the buffer size exceeds the first threshold.

5. The system of claim 4, wherein the packet shaper is interposed between the ingress device and the egress device.

6. The system of claim 4, wherein the packet shaper is operatively coupled to the ingress device.

7. The system of claim 6, wherein the packet shaper is directly connected to an output of the ingress device.

8. The system of claim 4, wherein the packet shaper is operatively coupled to the egress device.

9. The system of claim 4, the egress device comprising:
a cut-through buffer for cut-through switching of the packets; and
a store-and-forward buffer for store-and-forward switching of the packets.

10. The system of claim 4, wherein the packet shaper is responsive to the ingress device, the packet shaper being configured to pace the packets when the buffer size exceeds the first threshold value.

11. The system of claim 4, wherein the ingress device is further configured to determine whether the buffer size exceeds a second threshold value, the second threshold value being larger than the first threshold value.

12. The system of claim 11, wherein the ingress device is further configured to transition to a store-and-forward mode for store-and-forward switching from a cut-through mode when the buffer size exceeds the second threshold value.

13. An ingress device comprising:
a virtual output queue having a buffer size; and
circuitry configured to
determine whether an ingress transmission rate of the ingress device is faster than an egress transmission rate of an egress device;
determine whether the buffer size exceeds a first threshold value;
and capture cut-through-eligibility of the egress device;
and pace a packet to match the ingress transmission rate of the ingress device with the egress transmission rate when the ingress transmission rate is faster than the egress transmission rate and the buffer size exceeds the first threshold value.

14. The ingress device of claim 13, wherein the circuitry is configured to:
determine whether the buffer size exceeds a second threshold value; and
transition to store-and-forward switching when the buffer size exceeds the second threshold value.

15. The ingress device of claim 13, wherein the circuitry is configured to bypass cut-through switching in response to determining that the ingress transmission rate is slower than the egress transmission rate.

16. The ingress device of claim 13, further comprising:
a memory, wherein
the circuitry is configured by executing software or firmware stored in the memory.

17. The ingress device of claim 13, wherein
the circuitry is at least one of: one or more discrete logic circuits, one or more application specific integrated circuit (ASIC), one or more programmable gate arrays (PGA) and one or more field programmable gate arrays (FPGA).

* * * * *